US012801593B2

(12) United States Patent
Ma et al.

(10) Patent No.: US 12,801,593 B2
(45) Date of Patent: Nov. 17, 2026

(54) DATABASE QUERY MODIFICATION BASED ON PREDICATE COLUMN SIMILARITY

(71) Applicant: International Business Machines Corporation, Armonk, NY (US)

(72) Inventors: Xiao Ming Ma, Xi'an (CN); Xue Ying Zhang, Xi'an (CN); Sheng Yan Sun, Beijing (CN); XuQin Zhao, San Jose, CA (US); Si Er Han, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/828,477

(22) Filed: Sep. 9, 2024

(65) Prior Publication Data

US 2026/0072899 A1 Mar. 12, 2026

(51) Int. Cl.
*G06F 16/242* (2019.01)
*G06F 11/34* (2006.01)
*G06F 16/2455* (2019.01)

(52) U.S. Cl.
CPC ...... *G06F 16/2425* (2019.01); *G06F 11/3409* (2013.01); *G06F 16/24565* (2019.01)

(58) Field of Classification Search
CPC ....................... G06F 16/2425; G06F 16/24565
USPC .......................................................... 707/765
See application file for complete search history.

(56) References Cited

U.S. PATENT DOCUMENTS 6,453,314 B1 * 9/2002 Chan ................... G06F 16/2365
10,776,368 B1 * 9/2020 Caragea .............. G06F 16/2462
2012/0317134 A1 * 12/2012 Bourbonnais ....... G06F 16/2365 707/769
2013/0232143 A1 * 9/2013 Ait-Mokhtar ......... G06F 16/211 707/E17.014
2015/0142829 A1 * 5/2015 Lee ......................... G06F 16/13 711/170
2018/0074786 A1 * 3/2018 Oberbreckling .... G06F 16/2255
2020/0125746 A1 * 4/2020 Joshi ................... G06F 21/6245
2021/0034598 A1 * 2/2021 Arye ..................... G06F 16/288
2021/0365443 A1 11/2021 Mostafa et al.
2021/0390097 A1 12/2021 Rout et al.
2024/0330278 A1 * 10/2024 Farré Guiu ........... G06F 16/248

OTHER PUBLICATIONS

Neda Abolhassani, "Knowledge Graph Enabled Approaches for Query Rewriting and Concept Extraction", A Dissertation Submitted to the Graduate Faculty of The University of Georgia in Partial Fulfillment of the Requirements for the Degree Doctor of Philosophy, Jul. 25, 2019, 110 pages.

* cited by examiner

*Primary Examiner* — Muluemebet Gurmu
(74) *Attorney, Agent, or Firm* — Harrity & Harrity, LLP

(57) ABSTRACT

According to one embodiment of the present invention, a system for processing a query comprises one or more memories and at least one processor coupled to the one or more memories. The system identifies database table columns in a predicate of the query with a greatest association. The predicate of the query is modified based on an association between the identified database table columns. The modified query is performed to obtain results for the query. Embodiments of the present invention further include a method and computer program product for processing a query in substantially the same manner described above.

20 Claims, 8 Drawing Sheets

600

| QUERY NO. | QUERY1 (610) | FREQUENCY (TIMES/WEEK) (615) | AVERAGE TIME (MINS.) (620) | NO. ROWS (625) |
|---|---|---|---|---|
| 1 | SELECT * FROM TB1 WHERE A<C1<E AND c<C2<d | 800 | 2 | 3000 |
| 2 | SELECT * FROM TB1 WHERE B<C1<C AND ( a<C2<b or e<C2<f) | 200 | 0.5 | 1400 |
| 3 | SELECT * FROM TB1 WHERE C<C1<F AND 50< C3<100 | 400 | 105 | 6000 |
| 4 | SELECT * FROM TB1 WHERE C1 >G AND x<C4< | 600 | 0.3 | 500 |

650

| RANGE NO. | RANGE VALUES (660) |
|---|---|
| 1 | A<=C1<=B& c<C2<d |
| 2 | B<C1<=C& c<C2<d |
| 3 | B<C1<=C& a<C2<b |
| 4 | B<C1<=C& e<C2<f |
| 5 | C<C1<E& c<C2<d |
| 6 | C<C1<E& 50<C3<100 |
| 7 | E<C1<F& 50<C3<100 |
| 8 | C1>G& x<C4<y |

FIG.6

DATABASE QUERY MODIFICATION BASED ON PREDICATE COLUMN SIMILARITY

BACKGROUND

1. Technical Field

Present invention embodiments relate to query processing, and more specifically, to modifying queries based on similarity of predicate columns to increase query performance.

2. Discussion of the Related Art

In general database application usage, separation of the business layer and the entity logic layer produces some deviations, even for database designers and program developers with rich business and project experience. A common approach to database table design is to use two columns to persist one identical field. For example, begin_time and end_time columns may be used for a time field, min_age and max_age columns may be used for an age field, and east_long and west_long may be used for a longitude field.

Some rows may be filtered in a query based on a predicate (e.g., begin_time>21:21:43.905456 and end_time<21:21:43.905456, min_age>20 and max_age<50, and/or east_long>60 and west_long<160). For example, an original query may be of the form:

```
SELECT JOBID, BEGIN_TIMESTAMP,
TIME_INTERVAL, PROGRESS
FROM JOBSTABLE
WHERE BEGIN_TIMESTAMP >= VALUE1
AND END_TIMESTAMP <= VALUE2
```

A predicate may be used to retrieve one hour of data (e.g., WHERE BEGIN_TIMESTAMP>='00:00:00.000' AND END_TIMESTAMP<='01:00:00.000'). The database obtains all keys of the BEGIN_TIMESTAMP column from 00:00:00.000 and checks all keys of the END_TIMESTAMP column with values<=01:00:00.000. However, since a begin timestamp is less than a corresponding end timestamp, the database performs additional wasteful processing on the begin timestamp (for values of the begin timestamp exceeding the end timestamp) which significantly increases response time, especially for large database tables with numerous entries.

A typical query statement design is unable to determine this type of issue until the performance degrades. A similar situation exists for different database types and businesses based on a survival problem, a regional problem, or data calculation based on a different step size.

SUMMARY

According to one embodiment of the present invention, a system for processing a query comprises one or more memories and at least one processor coupled to the one or more memories. The system identifies database table columns in a predicate of the query with a greatest association. The predicate of the query is modified based on an association between the identified database table columns. The modified query is performed to obtain results for the query. Embodiments of the present invention further include a method and computer program product for processing a query in substantially the same manner described above.

BRIEF DESCRIPTION OF THE DRAWINGS

Generally, like reference numerals in the various figures are utilized to designate like components.

FIG. 6 is an illustration of an example of associating data based on similarity of predicate columns in a same table according to an embodiment of the present invention.

DETAILED DESCRIPTION

Figure 1:
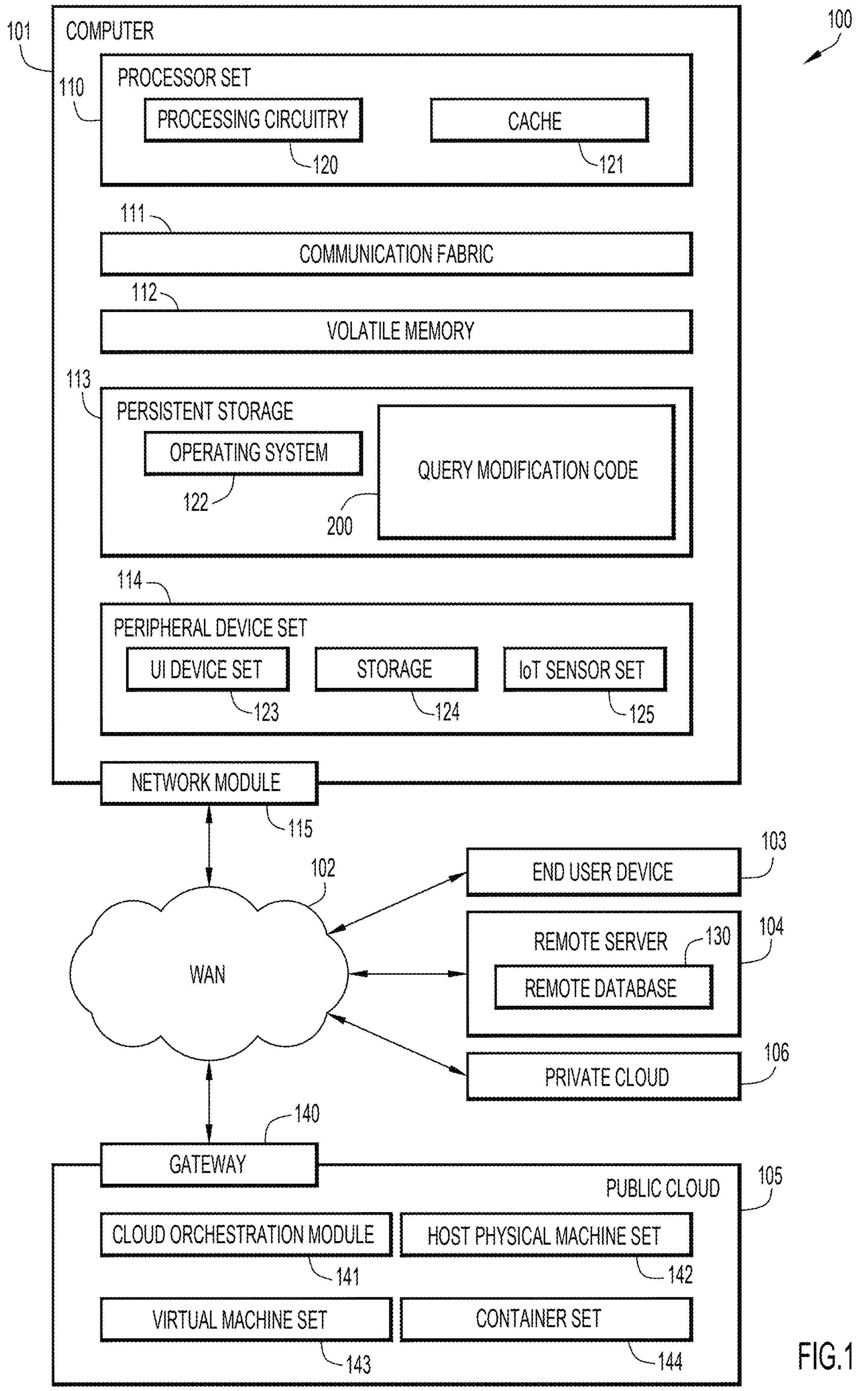
FIG. 1 is a diagrammatic illustration of an example computing environment according to an embodiment of the present invention.

An embodiment of the present invention provides an automatic process to determine an internal business relationship based on detection of similarity of predicate columns, and to rewrite or modify a query to attain increased performance. The embodiment analyzes a query predicate and data characteristics and uses syntactic structure and values analysis to train and build a model to rewrite or modify a query to improve performance and response time.

An embodiment of the present invention parses query text to extract predicate columns and determine candidate index columns based on catalog data. An association is determined between predicate columns and other index columns, and the best predicate column is recommended for rewriting or modification in the predicate based on association statistics. A query rewrite or modification recommendation is generated, and a new or modified query is generated based on the recommendation and tested to verify results and performance of the modified query. Data statistics are monitored and an association model is updated based on the data statistics.

According to an aspect of the invention, there is provided a method of processing a query. At least one processor identifies database table columns in a predicate of the query with a greatest association. The at least one processor modifies the predicate of the query based on an association between the identified database table columns. The at least one processor performs the modified query to obtain results for the query. This provides modification of the query in a manner that reduces the space for searching database table columns, thereby enabling the query to be performed with reduced processing and response time.

In embodiments, the method further comprises determining, via the at least one processor, associations between database table columns of the predicate and columns of one or more indexes on a database table of the query. This enables identification of predicate columns with sufficient similarity to reduce the search space for database table columns of the query predicate.

In embodiments, the associations include a confidence score and determining associations comprises determining the confidence score based on counts of values in the database table columns of the predicate and the columns of the one or more indexes. This enables identification of predicate columns with greatest similarity to reduce the search space for database table columns of the query predicate.

In embodiments, determining associations comprises determining the associations between the database table columns of the predicate and the columns of one or more indexes based on differences between data values and column descriptions. This ensures that identified predicate columns are sufficiently similar to reduce the search space for database table columns of the query predicate.

In embodiments, modifying the predicate of the query comprises adding a constraint on a column of the identified database table columns of the predicate based on a relationship between data values of the identified database table columns. The added constraint reduces the search space for a database table column of the predicate based on the relationship with another predicate column to reduce processing and response time.

In embodiments, identifying database table columns in a predicate of the query comprises generating a set of queries including the identified database table columns, and verifying the identified database table columns are associated by comparing results obtained from the set of queries. This ensures that identified predicate columns are sufficiently similar to reduce the search space for database table columns of the query predicate.

In embodiments, the method further comprises validating, via the at least one processor, the modified query by comparing results obtained from the query and the modified query. This ensures that the modified query produces compatible results to avoid unnecessary processing of erroneous queries.

According to an aspect of the invention, there is provided a system for processing a query. The system comprises one or memories and at least one processor coupled to the one or more memories. The at least one processor identifies database table columns in a predicate of the query with a greatest association. The at least one processor modifies the predicate of the query based on an association between the identified database table columns. The at least one processor performs the modified query to obtain results for the query. This provides modification of the query in a manner that reduces the space for searching database table columns, thereby enabling the query to be performed with reduced processing and response time.

In embodiments of the system, the at least one processor is further configured to determine associations between database table columns of the predicate and columns of one or more indexes on a database table of the query. This enables identification of predicate columns with sufficient similarity to reduce the search space for database table columns of the query predicate.

In embodiments of the system, the associations include a confidence score and determining associations comprises determining the confidence score based on counts of values in the database table columns of the predicate and the columns of the one or more indexes. This enables identification of predicate columns with greatest similarity to reduce the search space for database table columns of the query predicate.

In embodiments of the system, determining associations comprises determining the associations between the database table columns of the predicate and the columns of one or more indexes based on differences between data values and column descriptions. This ensures that identified predicate columns are sufficiently similar to reduce the search space for database table columns of the query predicate.

In embodiments of the system, modifying the predicate of the query comprises adding a constraint on a column of the identified database table columns of the predicate based on a relationship between data values of the identified database table columns, and validating the modified query by comparing results obtained from the query and the modified query. The added constraint reduces the search space for a database table column of the predicate based on the relationship with another predicate column to reduce processing and response time. The validation ensures that the modified query produces compatible results to avoid unnecessary processing of erroneous queries.

In embodiments of the system, identifying database table columns in a predicate of the query comprises generating a set of queries including the identified database table columns, and verifying the identified database table columns are associated by comparing results obtained from the set of queries. This ensures that identified predicate columns are sufficiently similar to reduce the search space for database table columns of the query predicate.

According to an aspect of the invention, there is provided a computer program product for processing a query. The computer program product comprises one or more computer readable storage media having program instructions collectively stored on the one or more computer readable storage media. The program instructions are executable by at least one processor. The at least one processor identifies database table columns in a predicate of the query with a greatest association. The at least one processor modifies the predicate of the query based on an association between the identified database table columns. The at least one processor performs the modified query to obtain results for the query. This provides modification of the query in a manner that reduces the space for searching database table columns, thereby enabling the query to be performed with reduced processing and response time.

In embodiments of the computer program product, the program instructions further cause the at least one processor to determine associations between database table columns of the predicate and columns of one or more indexes on a database table of the query. This enables identification of predicate columns with sufficient similarity to reduce the search space for database table columns of the query predicate.

In embodiments of the computer program product, the associations include a confidence score and determining associations comprises determining the confidence score based on counts of values in the database table columns of the predicate and the columns of the one or more indexes. This enables identification of predicate columns with greatest similarity to reduce the search space for database table columns of the query predicate.

In embodiments of the computer program product, determining associations comprises determining the associations between the database table columns of the predicate and the columns of one or more indexes based on differences between data values and column descriptions. This ensures that identified predicate columns are sufficiently similar to reduce the search space for database table columns of the query predicate.

In embodiments of the computer program product, modifying the predicate of the query comprises adding a constraint on a column of the identified database table columns of the predicate based on a relationship between data values of the identified database table columns. The added constraint reduces the search space for a database table column of the predicate based on the relationship with another predicate column to reduce processing and response time.

In embodiments of the computer program product, identifying database table columns in a predicate of the query comprises generating a set of queries including the identified database table columns, and verifying the identified database table columns are associated by comparing results obtained from the set of queries. This ensures that identified predicate columns are sufficiently similar to reduce the search space for database table columns of the query predicate.

In embodiments of the computer program product, the program instructions further cause the at least one processor to validate the modified query by comparing results obtained from the query and the modified query. This ensures that the modified query produces compatible results to avoid unnecessary processing of erroneous queries.

In an example scenario, an original query may be of the form:

```
SELECT JOBID, BEGIN_TIMESTAMP,
TIME_INTERVAL, PROGRESS
FROM JOBSTABLE
WHERE BEGIN_TIMESTAMP >= '00:00:00.000'
AND END_TIMESTAMP <=
'01:00:00.000'
```

The database obtains all keys of the BEGIN_TIMESTAMP column from 00:00:00.000 and checks all keys of the END_TIMESTAMP column with values<=01:00:00.000. However, since a begin timestamp is less than a corresponding end timestamp, the database performs additional wasteful processing on the begin timestamp (for values of the begin timestamp exceeding the end timestamp) which significantly increases response time, especially for large database tables with numerous entries.

Accordingly, an embodiment of the present invention analyzes the query predicate and determines that the begin timestamp and end timestamp are similar columns and relate to times, where a begin timestamp is less than (or prior to) a corresponding end timestamp. The embodiment of the present invention modifies the original query to include an additional condition or constraint in the predicate for the begin timestamp column (e.g., BEGIN_TIMESTAMP<='01:00:00.000') to reduce or limit processing of the begin timestamp column. By way of example, the modified query may include a predicate of the form:

```
WHERE BEGIN_TIMESTAMP >= '00:00:00.000'
AND BEGIN_TIMESTAMP <=
'01:00:00.000' AND END_TIMESTAMP <=
'01:00:00.000'.
```

The modified query is performed (or executed) in place of the original query to produce results with increased computing efficiency and reduced response time.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as query modification code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future.

In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
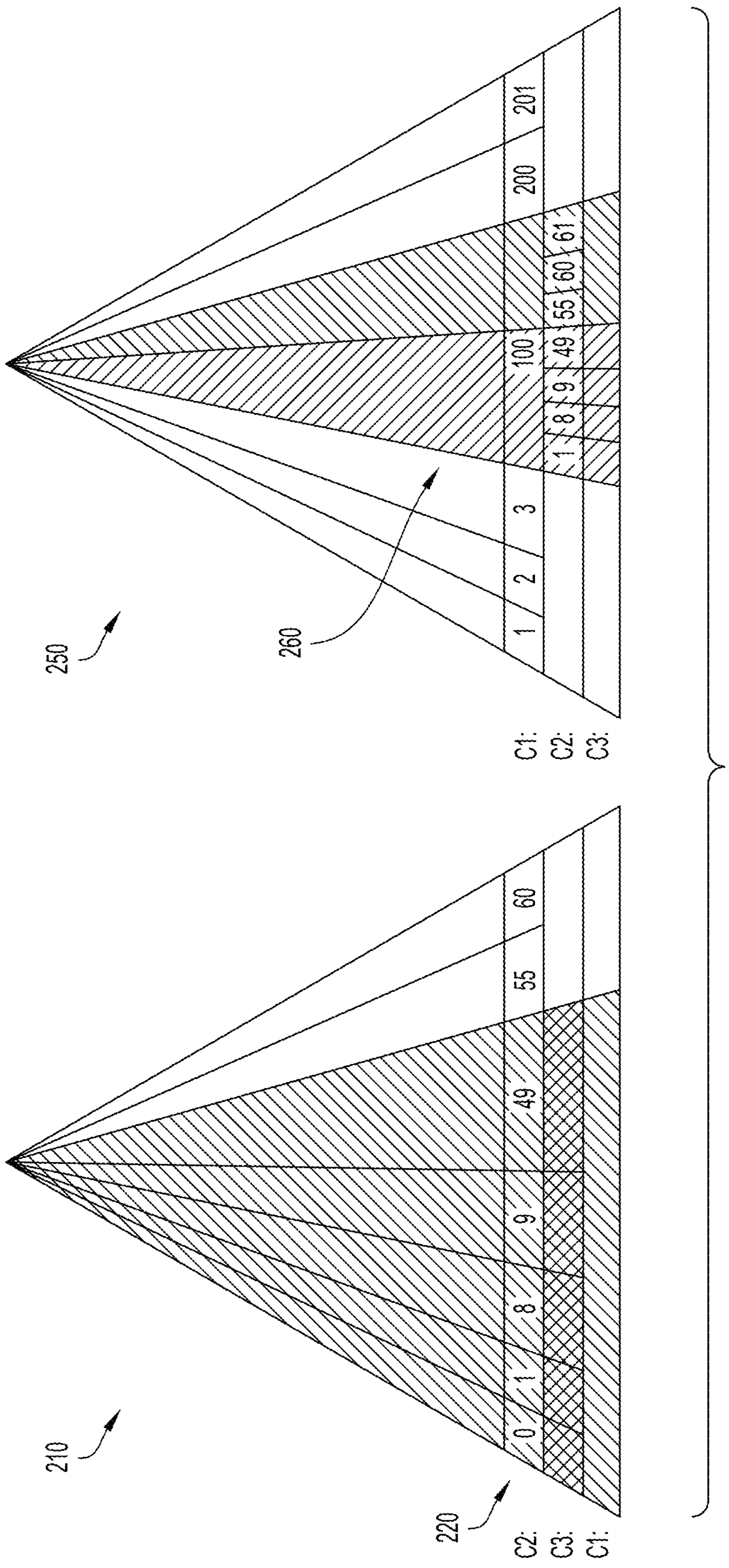
FIG. 2 is a diagrammatic illustration of database table scanning for an original query and a modified query of an embodiment of the present invention.

An embodiment of the present invention determines similarity between predicate columns, and rewrites or modifies a query based on the similarity to attain increased performance. Database table scanning for an original query and a modified query produced according to an embodiment of the present invention is illustrated in FIG. 2. An original query may produce a scan 210 across columns of a database (e.g., C1, C2, and C3 as viewed in FIG. 2) to produce results 220 satisfying the query predicate containing those columns. The database obtains all keys of the columns according to the conditions for the columns in the query predicate. For example, values from column C3 satisfying the query have corresponding values in column C2. Although the data of columns C2 and C3 may have a relationship (e.g., a value of C2 is less than a corresponding value of C3), the original query unnecessarily performs processing for additional values of column C2 (greater than the values of column C3) which significantly increases response time, especially for large database tables with numerous entries.

Accordingly, an embodiment of the present invention detects the similarity between columns C2 and C3 and modifies the predicate of the original query to limit processing of column C2 based on the relationship with column C3. The modified query may produce a scan 250 across columns of a database (e.g., C1, C2, and C3 as viewed in FIG. 2) to produce results 260 satisfying the query predicate containing those columns. The modified query includes an additional condition or constraint on column C2 based on the relationship (e.g., C2 is less than or equal to the value in the predicate for column C3) to reduce or limit the processing of column C2 to values according to the relationship.

By way of example, an original query may be of the form:

```
SELECT JOBID, BEGIN_TIMESTAMP,
TIME_INTERVAL, PROGRESS
FROM JOBSTABLE
WHERE BEGIN_TIMESTAMP >= '00:00:00.000'
AND END_TIMESTAMP <=
```

-continued

| |
|---|
| '01:00:00.000' |

An embodiment of the present invention analyzes the query predicate and determines that the begin timestamp and end timestamp are similar columns and relate to times, where a begin timestamp is less than (or prior to) a corresponding end timestamp. Accordingly, the embodiment of the present invention modifies the original query to include an additional condition or constraint in the predicate for the begin timestamp column (e.g., BEGIN_TIMESTAMP<='01:00:00.000') to reduce or limit processing of the begin timestamp column. By way of example, the modified query may include a predicate of the form:

```
WHERE BEGIN_TIMESTAMP >= '00:00:00.000'
  AND BEGIN_TIMESTAMP <=
'01:00:00.000' AND END_TIMESTAMP <=
'01:00:00.000'.
```

Figure 3:
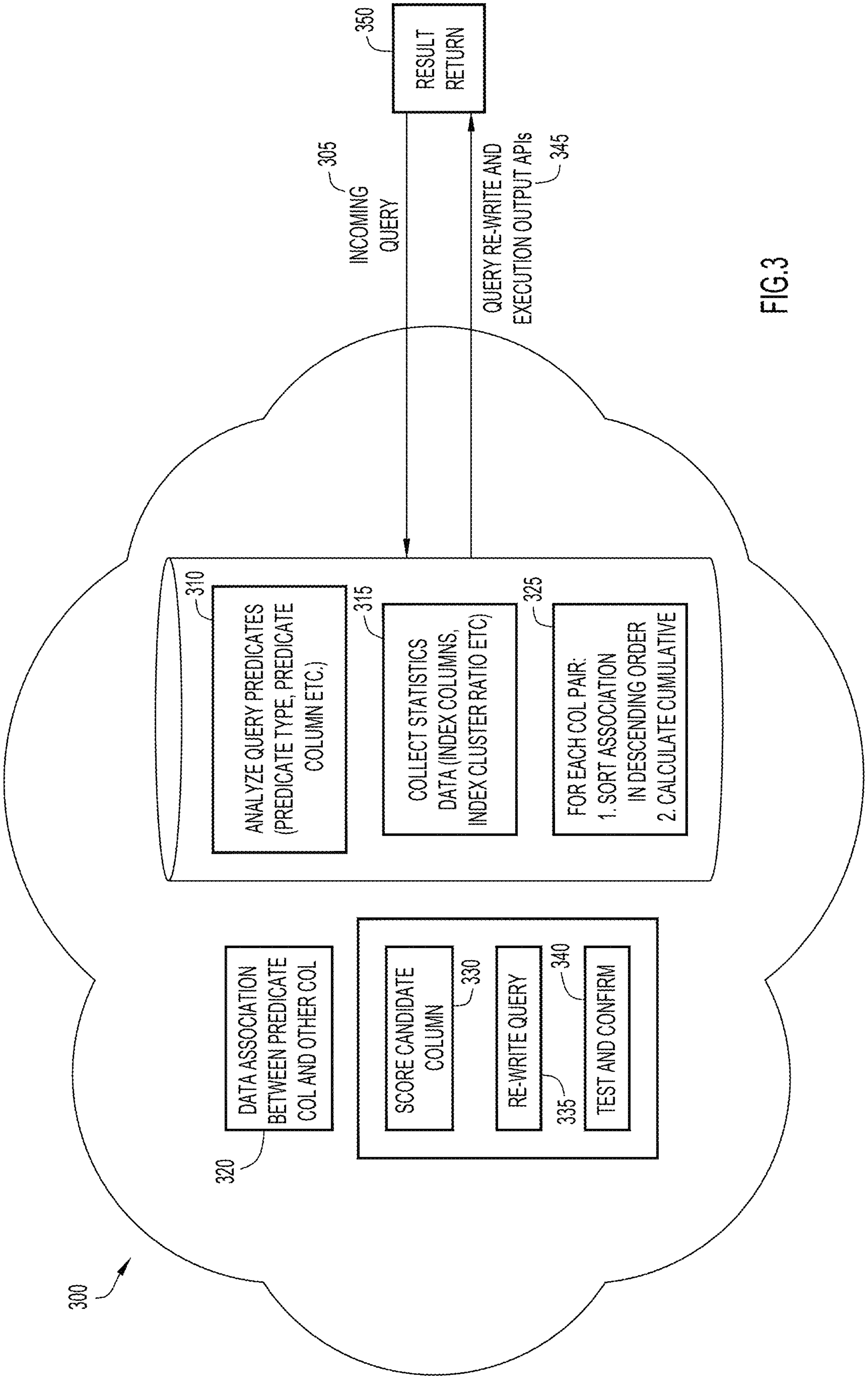
FIG. 3 is a flow diagram of a manner of modifying a query based on similarity of predicate columns according to an embodiment of the present invention.

A method 300 of modifying a query based on similarity of predicate columns (e.g., via query modification code 200, computer 101, etc.) according to an embodiment of the present invention is illustrated in FIG. 3. Initially, an incoming query 305 with a predicate indicating one or more database table columns is received. The query predicate is analyzed at operation 310 to determine various information (e.g., predicate type, predicate columns, etc.). Data statistics for columns of database tables of query 305 are collected at operation 315 (e.g., statistics of index columns, index cluster ratio (e.g., a greater ratio indicates rows are better ordered in index key sequence), etc.) to determine associations between data of database table columns as described below.

Associations are determined between data of the columns of the query predicate and data of index columns at operation 320 as described below. For example, an index may be created with three columns (e.g., CREATE index IDX1 ON Tab1 (C1, C2, C3)). Index columns include the columns in index IDX1 (e.g., C1, C2, C3). Most predicate columns use index columns for general query statement usage. However, when the predicate column of a frequently used query does not belong to an index, it is generally recommended that a user create an index based on the actual application, or in combination with other predicate columns of commonly used combined queries. Based on the general usage, predicate columns are compared to index columns and other used predicate columns to reduce calculations.

Each pair of columns (e.g., a query predicate column and another column (predicate or index column)) is analyzed at operation 325. For example, the index columns are obtained based on all indexes on a table of the predicate column (e.g., find all indexes on the table, where each index has index columns). The association for a pair of columns (e.g., a query predicate column and another column (predicate or index column)) is sorted in descending order and a cumulative count of data (or rows) appearing in each of the columns satisfying the query are determined. The cumulative counts are used to determine a confidence score for each predicate column with respect to another column (predicate or index column) at operation 330 to identify a best predicate column for rewriting or modification of the query as described below.

The query is rewritten at operation 335. For example, the query may be modified by rewriting or modifying the query predicate to include an additional condition or constraint for the identified column as described below. The modified query is tested and confirmed or validated at operation 340. Once validated, the modified query is executed at operation 345 and results 350 are returned (e.g., via application programming interfaces (API), etc.).

Figure 4:
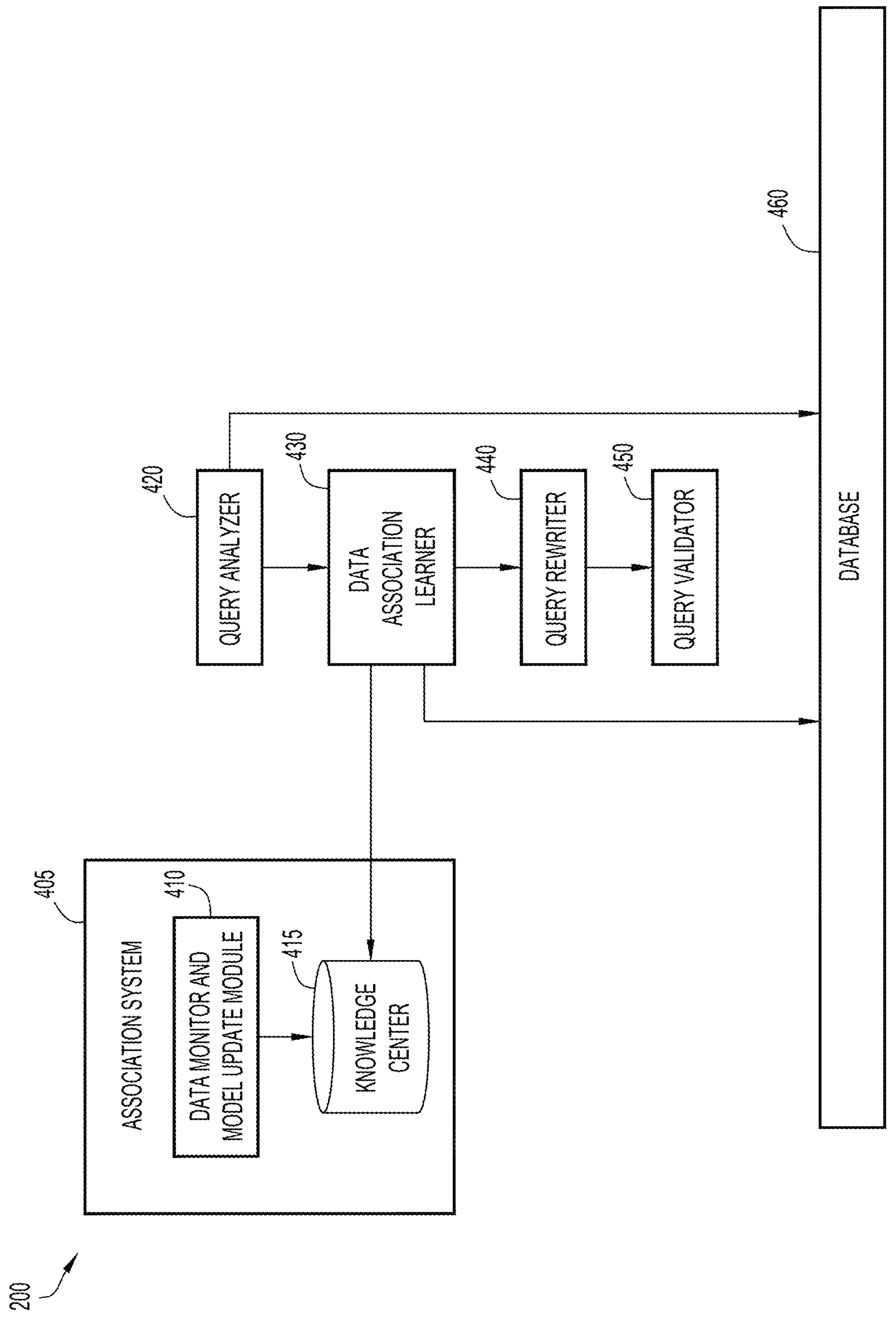
FIG. 4 is a block diagram of query modification code for modifying a query based on similarity of predicate columns according to an embodiment of the present invention.

A block diagram of query modification code 200 for modifying a query based on similarity of predicate columns according to an embodiment of the present invention is illustrated in FIG. 4. Query modification code 200 includes an association system 405, a query analyzer 420, a data association learner 430, a query rewriter 440, and a query validator 450. The query modification code may operate with respect to a corresponding database 460 (e.g., remote database 130, etc.).

Association system 405 includes a data monitor and model update module 410 and a knowledge center 415. The knowledge center stores an association model for each pair of database table (or index) columns and the associations between those columns. The association model may employ any conventional or other natural language processing (NLP) techniques and/or machine learning models. The natural language processing (NLP) techniques may include various techniques (e.g., entity recognition, relationship discovery, semantic analysis, sentiment analysis, part-of-speech (POS) tagging, etc.). The machine learning models may include any conventional or other machine learning models (e.g., mathematical/statistical, classifiers, feed-forward, recurrent, convolutional, deep learning, or other neural networks, large language models (LLM), etc.).

For example, with respect to numeric class fields, the association model may include any conventional or other mathematical models to indicate correlations by calculating numerical relationships between two columns, or by calculating underlying functional relationships. By way of example, the association model may include a formulaic model for determining relationships between numeric columns (e.g., a different value for each record is always greater than zero or less than or equal to zero in a numeric column comparison to indicate a greater than or less than relationship between the numeric columns, etc.).

Further, in a field description, field name, and/or field information, character type information can be classified and discovered by any conventional or other machine learning model (e.g., recurrent or other neural network, etc.), or by association rules. By way of example, an association model may include a neural network. For example, neural networks may include an input layer, one or more intermediate layers (e.g., including any hidden layers), and an output layer. Each layer includes one or more neurons, where the input layer neurons receive input (e.g., column data or features, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning of the neural network may be performed using a training set of various example column data, features, and/or information as input and corresponding desired outputs (e.g., association, data classification (e.g., numeric, character, etc.), etc.), where the neural network attempts to produce the provided output and uses an error from the output (e.g., difference between produced and known outputs) to adjust weight (and bias) values (e.g., via backpropagation or other training techniques).

The output layer neurons may indicate a probability for the input data being associated with a corresponding output (e.g., type or presence of an association, data classification, etc.). The output with the highest probability may be selected as the result.

Data monitor and model update module 410 monitors statistics of data in database table columns of database 460 (e.g., distribution, etc.). This process may be performed in the background during performance of other tasks. When distribution or other statistics of a database table column changes, the association model for the column is updated (or re-trained) based on updated column data. For example, the associations for the column may be updated using the mathematical models. Further, the machine learning models may be retrained based on the updated statistics.

Query analyzer 420 analyzes query predicates to determine various information (e.g., predicate type, predicate columns, etc.) and reads a catalog of database 460 to obtain index definition and statistics (e.g., statistics of index columns, index cluster ratio (e.g., a greater ratio indicates rows are better ordered in index key sequence), etc.) (e.g., corresponding to operations 310, 315 of FIG. 3). The query analyzer provides predicate columns and index columns (from indexes on the database table of the query) to determine associations between data of the predicate (and index) columns.

Data association learner 430 learns and determines associations between database table columns and identifies a best predicate column for modification (e.g., corresponding to operations 320, 325, and 330 of FIG. 3).

Query rewriter 440 modifies the query based on results from data association learner 430 (e.g., corresponding to operation 335 of FIG. 3). The query rewriter determines a predicate operator (or constraint) and rewrites or modifies the query. The query rewriter may support various query structures based on a parser tree. The query modification may employ a rule-based approach (e.g., including rules indicating conditions or relationships, columns, and corresponding operations to rewrite the query, etc.) and confirm reliability of the modified query. For example, when a pair of columns (C1, C2) have a relationship where C1 is always greater than C2 for a query predicate (e.g., C1>Value1 and C2>Value2), a rule may direct a modification to add a constraint (C2<Value1) to the query.

By way of example, an original query may be of the form:

```
SELECT JOBID, BEGIN_TIMESTAMP,
TIME_INTERVAL, PROGRESS
FROM JOBSTABLE
WHERE BEGIN_TIMESTAMP >= VALUE1
AND END_TIMESTAMP <=
VALUE2.
```

A relationship may be discovered where data from the BEGIN_TIMESTAMP column is less than corresponding data for the END_TIMESTAMP column. Accordingly, the query rewriter may produce a modified query (with an additional condition on the begin timestamp column) after analysis of the form:

```
SELECT JOBID, BEGIN_TIMESTAMP,
TIME_INTERVAL, PROGRESS
```

-continued

```
FROM JOBSTABLE
WHERE BEGIN_TIMESTAMP >= VALUE1 AND
END_TIMESTAMP <= VALUE2 AND
BEGIN_TIMESTAMP <= VALUE2.
```

When columns are defined with a relationship and appear in the query predicate (e.g., WHERE and/or HAVING clauses, etc.), the predicate may be modified based on rules in substantially the same manner described above. When a column expression appears in other query sections (e.g., SELECT, ORDER BY, etc.), the section may be modified in substantially the same manner described above and based on a cost (e.g., performance cost, average time 620 (FIG. 6), etc.). For example, with respect to a modified column expression of an ORDER BY clause, two columns are verified as being on the same index or in the result set with a same data order (e.g., ascending, descending, etc.). The modified query is validated to confirm that a newly added predicate column or newly added column into an ORDER BY clause does not result in an incorrect output.

Query validator 450 tests and validates the modified query against database 460, and provides the resulting modified query and results (e.g., corresponding to operations 340, 345 of FIG. 3). For example, the query validator may verify syntax, performance, and results of the modified query. By way of example, the modified query may be processed (or applied to a test dataset of database 460) to produce a result set in substantially the same manner described below. Initially, the count (or number) of results in the result set is examined. When the result set is small (e.g., less than a threshold number of results, etc.), results from the original and modified queries applied directly on the test dataset are compared. When the result set is large (e.g., greater than or equal to the threshold number of results, etc.), the results are sampled (e.g., sample 20%, 50%, 70%, etc. of the records) and compared. When the result sets of the original and modified queries are the same, the modified query is considered to be valid.

Figure 5:
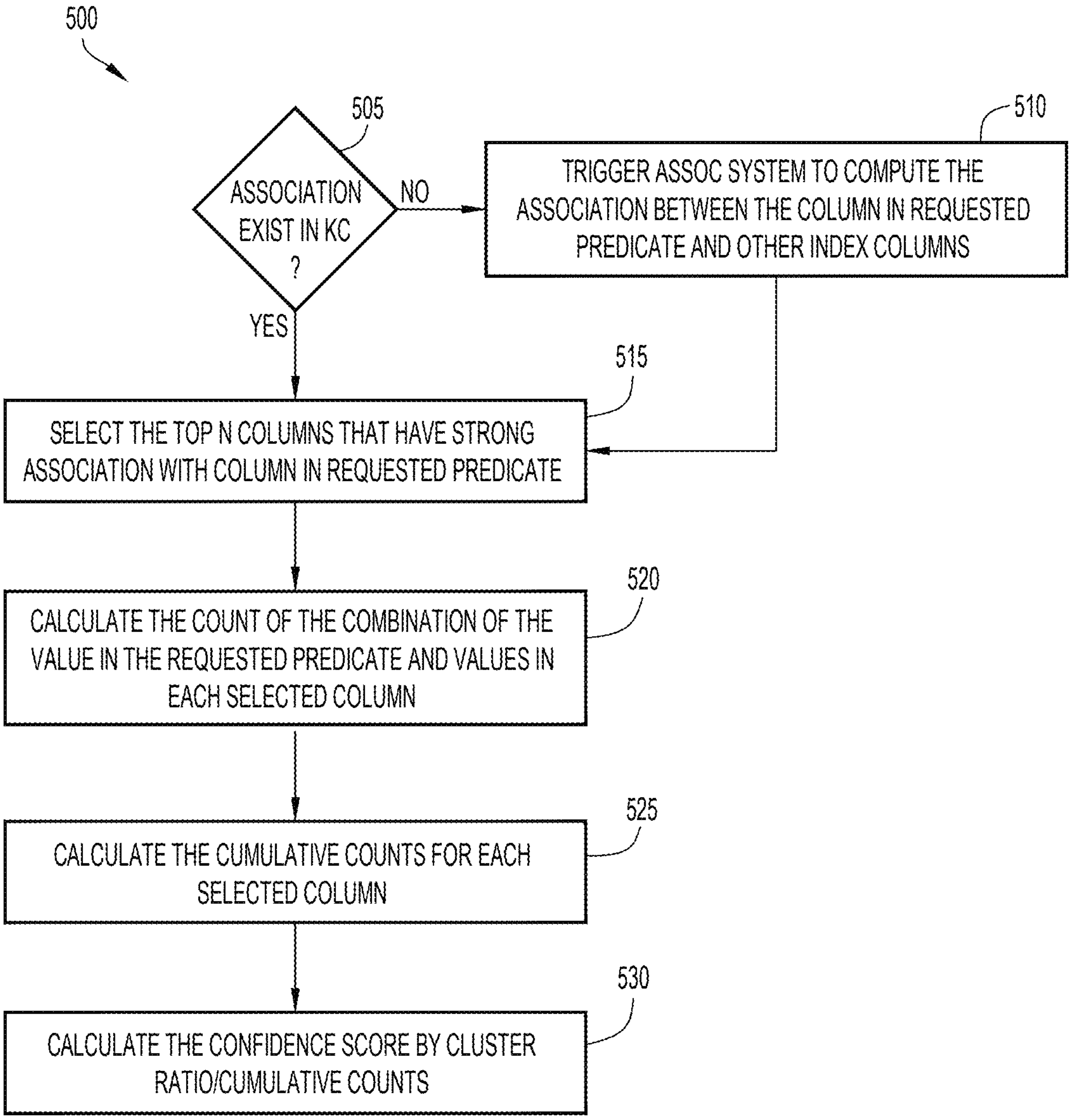
FIG. 5 is procedural flowchart of a method for associating data according to an embodiment of the present invention.

A method 500 for associating data (e.g., via query modification code 200, data association learner 430, computer 101, etc.) according to an embodiment of the present invention is illustrated in FIG. 5. Initially, a query including a predicate indicating database table columns is received for processing. The predicate columns are processed to identify associations between the predicate columns and other columns (predicate or index columns) for modification of the query. A column of the query predicate is identified, and knowledge center 415 (FIG. 4) is accessed to retrieve one or more associations for the predicate column with respect to other columns (e.g., predicate or index columns, etc.). When associations for the predicate column (with respect to other predicate or index columns) do not exist in the knowledge center as determined at operation 505, association system 405 is directed to determine associations between the predicate column and other columns (predicate or index columns) at operation 510 in substantially the same manner described below.

Once associations for the predicate column are retrieved or determined, a certain number of other predicate or index columns with a greatest association with the predicate column is selected (e.g., top N columns as viewed in FIG. 5) at operation 515. The columns are selected based on a confidence score or other similarity metric for the association determined in substantially the same manner described below.

A count of a value satisfying the query predicate for the predicate column appearing in each of the selected columns is determined at operation 520. For example, when a query predicate requests the value of the predicate column be between 1 and 10, the count or number of each value between 1 and 10 appearing in the selected columns is determined (e.g., a count of the quantity of ones in the selected columns, a count of the quantity of twos in the selected columns, etc.). The cumulative count for each selected column is determined at operation 525 (e.g., the total number of values between 1 and 10 appearing each selected column, etc.).

A confidence score for each selected column is determined based on the cumulative counts for that selected column at operation 530. The confidence score represents an association between the predicate column and a corresponding selected column. The confidence score is used to confirm that columns are related. By way of example, the confidence score may be expressed for a selected column as:

Confidence score = cluster ratio/cumulative count, where the cluster ratio may be determined based on a ratio of the values in the column in key sequence and the total number of values. The confidence score is used to identify similar columns (e.g., greatest confidence score or greatest association, etc.) for modification of the query.

In addition, value ranges used for predicates may be used to determine the confidence score for columns. For example, frequently run historical queries, columns used, and value ranges of the columns in query predicates may be analyzed to divide different columns and value ranges into multiple groups. The confidence score may be calculated according to the subdivided column/value combination to enable the value range (of the predicate and other predicate or index columns) to be compared for determining the counts/cumulative counts and association between columns. In other words, each column is divided by value ranges and similarity is calculated on each value range to improve accuracy of the similarity measure (or confidence score). The confidence scores for each value range may be combined in any fashion to produce an overall confidence score (e.g., average or weighted average, etc.).

An example of associating data based on similarity of predicate columns in a same table according to an embodiment of the present invention is illustrated in FIG. 6. Initially, a table 600 includes a query column 610 for queries, a frequency column 615 for a frequency or number of times the query is processed, an average time column 620 providing an average time for the query (or cost), and a row quantity column indicating the number of rows (or counts) satisfying the query. Each row provides information for a corresponding query, where the queries of column 610 provide different predicates (e.g., various value ranges and columns). Table 650 provides information for ranges of the query predicate 660. This information is used to associate predicate columns in substantially the same manner described herein.

For example, by analyzing frequently run historical queries 610, columns used, and value ranges of the columns in query predicates, different columns and value ranges are divided into multiple groups. The confidence score is calculated according to the subdivided column/value combination to enable the value range (of the predicate and other predicate or index columns) to be compared for determining the association between columns. In other words, each column is divided by value ranges and similarity is calculated on each value range to improve accuracy of the similarity measure (or confidence score). The confidence score is used to ensure that the relationship between two columns is reliable. When selecting related columns to rewrite a query, only the most reliable candidates are selected (based on the confidence score) to reduce the processing.

Figure 7:
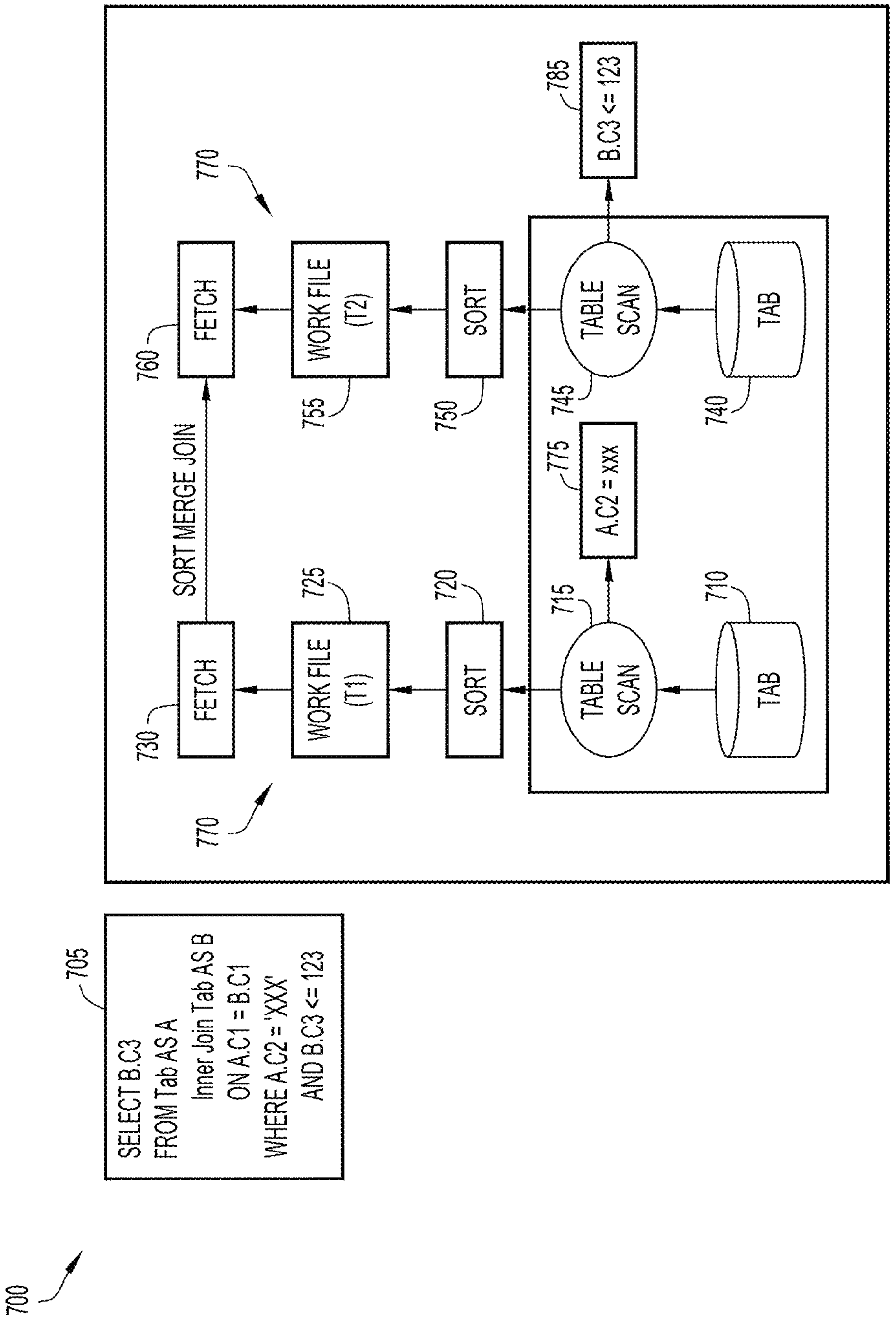
FIG. 7 is an illustration of an example of associating data based on multiple table scans according to an embodiment of the present invention.

The query modification of present invention embodiments based on similarity of predicate columns may be performed for columns in the same database table, or for multiple table scans of different tables. An example of associating data based on multiple table scans of different tables according to an embodiment of the present invention is illustrated in FIG. 7. By way of example, a query 705 involves a sort merge join of tables A, B, and may be of the form:

```
SELECT B.C3
FROM Tab AS A
Inner Join Tab AS B
ON A.C1 = B.C1
WHERE A.C2 = 'XXX' AND B.C3 <= 123.
```

Workflow 770 for table 710 (Table A) includes a table scan at flow 715 for the predicate column 775 from table 710 (A.C2=XXX). The results from the scan are sorted at flow 720 to produce a workfile for the join at flow 725. The appropriate information for the join is fetched from the workfile at flow 730.

Workflow 780 for table 740 (Table B) includes a table scan at flow 745 for the predicate column 785 from table 740 (B.C3<=123). The results from the scan are sorted at flow 750 to produce a workfile for the join at flow 755. The appropriate information for the join is fetched from the workfile at flow 760 and the join (e.g., sort merge join, etc.) is performed with the results from flow 730.

The query modification of present invention embodiments may be applied to the predicate for the different tables in substantially the same manner described above. For example, a relationship or similarity may be determined between the predicate column from table 710 (C2) and the predicate column from table 740 (C3). The predicate may be modified to include an additional condition or constraint for one or more of the predicate columns based on the relationship to limit processing of the predicate column.

Figure 8:
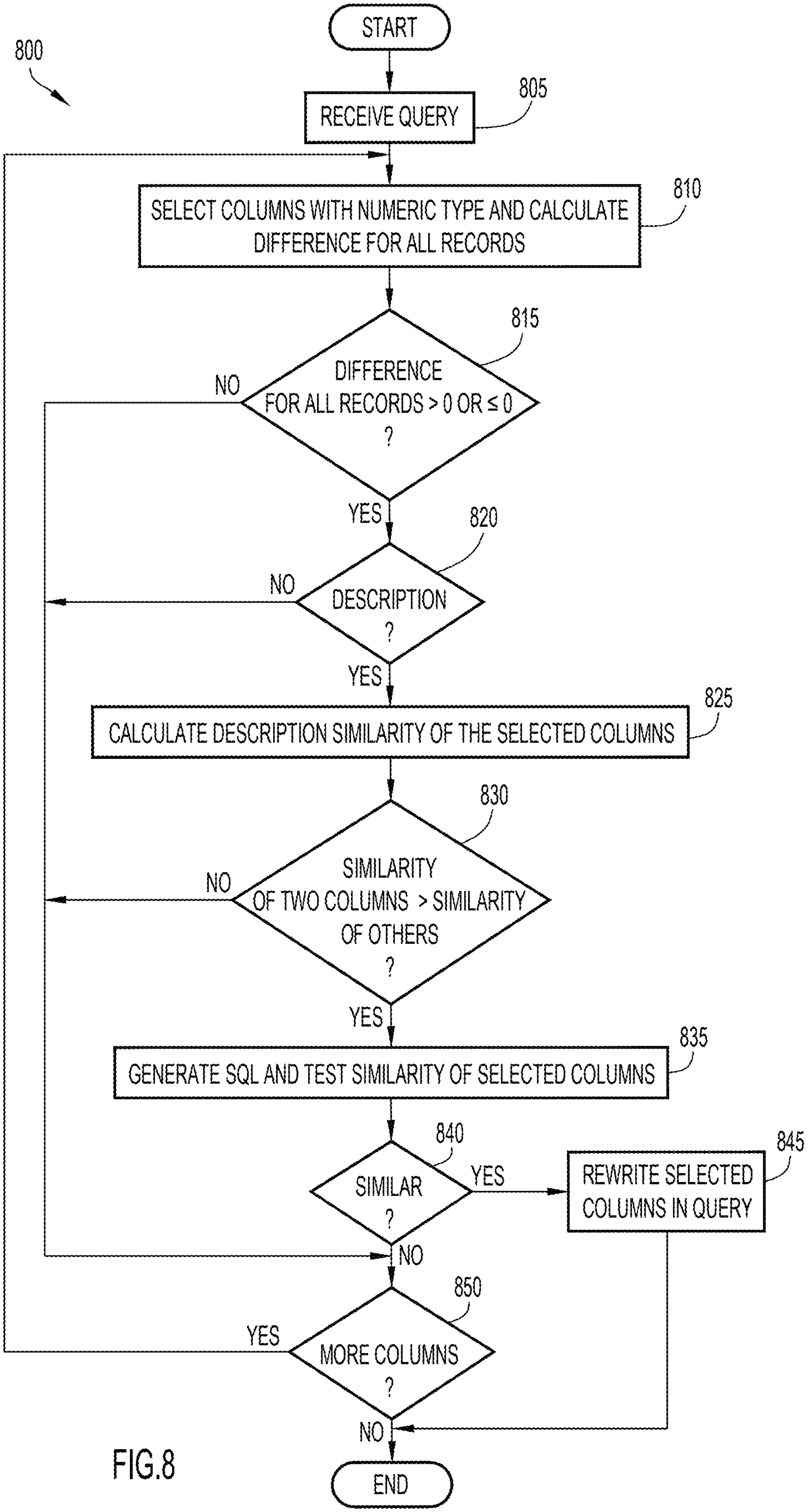
FIG. 8 is a procedural flowchart of a method for rewriting queries based on data association according to an embodiment of the present invention.

A method 800 for rewriting queries based on data association (e.g., via query modification code 200, query analyzer 420, data association learner 430, query rewriter 440, query validator 450, computer 101, etc.) according to an embodiment of the present invention is illustrated in FIG. 8. Initially, a query including a predicate indicating database table columns is received for processing at operation 805. The predicate is analyzed to determine columns for rewriting or modification of the query. The columns are selected based on a similarity measure or metric (e.g., confidence score, other similarity measures or metrics, etc.). By way of example, a predicate column with numeric values is identified for comparison to another column (predicate column or index columns from indexes on the database table of the query) with numeric values. The difference of the columns is determined at operation 810. When the difference between values for each record (of the columns) is greater than zero or less than or equal to zero as determined at operation 815, the two columns are selected as candidate columns (e.g., for rewriting or modification of the query).

When descriptions (e.g., column names, etc.) for the candidate columns exist as determined at operation 820, the similarity (or difference) between the descriptions is determined at operation 825. This may be accomplished using any conventional or other natural language processing (NLP) techniques and/or machine learning models. The natural language processing (NLP) techniques may include various techniques (e.g., entity recognition, relationship discovery, semantic analysis, sentiment analysis, part-of-speech (POS) tagging, etc.). The machine learning models may include any conventional or other machine learning models (e.g., mathematical/statistical, classifiers, feed-forward, recurrent, convolutional, deep learning, or other neural networks, large language models (LLM), etc.).

When the similarity for the descriptions of the candidate columns is greater than a similarity between the candidate columns and other columns (predicate or index columns) as determined at operation 830, the candidate columns are selected for rewriting or modifying the query. The similarity may be based on a similarity value (or difference) between the descriptions (e.g., determined via any conventional or other distance metric, etc.). The operational similarity of the candidate columns is tested against data at operation 835. For example, Structured Query Language (SQL) is generated to test the operational similarity of the candidate columns. By way of example, for a set of candidate columns A and B, a set of SQL queries may be generated. A SQL query of the set may be of the form "Select*Where A>$V_A$ and B>$V_B$", where $V_A$ is the mean of values in column A, and $V_B$ is the mean for values in column B. The SQL query is rewritten to produce another SQL query of the set of a form of "Select*Where A>$V_A$ AND A<$V_B$ AND B>$V_B$".

The original and rewritten SQL queries of the set are tested on (or performed or executed against) records of a database table to determine matching results. When the database table is large (e.g., number of records exceed a threshold, etc.), sampling may be employed to determine results (e.g., sample 20%, 50%, 70%, etc. of the records, etc.). When the results of the original and rewritten SQL queries are the same as determined at operation 840, the candidate columns are verified and selected as similar predicate columns and the query is rewritten at operation 845 in substantially the same manner described above. For example, the query modification may employ a rule-based approach (e.g., including rules indicating conditions or relationships, columns, and corresponding operations to rewrite the query, etc.) and confirm reliability of the modified query. By way of example, when a pair of columns (C1, C2) have a relationship (e.g., as determined at operation 815) where C1 is always greater than C2 for a query predicate (e.g., C1>Value1 and C2>Value2), a rule may direct a modification to add a constraint (C2<Value1) to the query. The candidate columns may be saved as similar columns for modification of future queries.

When the difference between the selected columns is not satisfied as determined at operation 815, the descriptions do not exist as determined at operation 820, the descriptions are not similar as determined at operation 830, or the candidate columns are not similar as determined at operation 840, the above process repeats from operation 810 until the predicate (and index) columns have been processed as determined at operation 850. The process may be applied on one table or joint tables in substantially the same manner described above.

It will be appreciated that the embodiments described above and illustrated in the drawings represent only a few of the many ways of implementing embodiments for database query modification based on predicate column similarity.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., query modification code 200, data monitor and model update module 410, query analyzer 420, data association learner 430, query rewriter 440, query validator 450, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., queries, query modifications, statistics, results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., queries, query modifications, statistics, results, etc.).

The present invention embodiments are not limited to the specific tasks or algorithms described above, but may be utilized for modifying queries for any quantity of any types of columns and any quantity of any types of databases or database tables.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing a query comprising:

identifying, via at least one processor, database table columns in a predicate of the query with a greatest association;

modifying, via the at least one processor, the query by modifying the predicate of the query based on an association between the identified database table columns, wherein the association is determined by dividing each of the identified database table columns according to value ranges and calculating a respective similarity value for each value range, wherein modifying the predicate of the query comprises analyzing the predicate of the query to determine that a begin timestamp column and an end timestamp column of the identified database table columns are related to time values, where a begin timestamp value is less than a corresponding end timestamp value in the predicate of the query, and adding a constraint in the predicate of the query for the begin timestamp column, and wherein the constraint is based on a relationship between data values of the begin timestamp column and the end timestamp column; and performing, via the at least one processor, the modified query to obtain results for the query.

2. The method of claim 1, further comprising:

determining, via the at least one processor, associations between database table columns of the predicate of the query and columns of one or more indexes on a database table of the query.

3. The method of claim 2, wherein the associations include a confidence score and determining associations comprises:

determining the confidence score based on counts of values in the database table columns of the predicate of the query and the columns of the one or more indexes.

4. The method of claim 2, wherein determining associations comprises:

determining the associations between the database table columns in the predicate of the query and the columns of one or more indexes based on differences between data values and column descriptions.

5. The method of claim 1, wherein identifying database table columns in a predicate of the query comprises:

generating a set of queries including the identified database table columns; and verifying the identified database table columns are associated by comparing results obtained from the set of queries.

6. The method of claim 1, further comprising:

validating, via the at least one processor, the modified query by comparing results obtained from the query and the modified query.

7. A system for processing a query comprising:

one or more processors; and one or more memory devices coupled to the one or more processors, wherein the one or more processors are configured to:

identify database table columns in a predicate of the query with a greatest association;

modify the query by modifying the predicate of the query based on an association between the identified database table columns, wherein the association is determined by dividing each of the identified database table columns according to value ranges and calculating a respective similarity value for each value range, wherein to modify the predicate of the query, the one or more processors are configured to analyze the predicate of the query to determine that a begin timestamp column and an end timestamp column of the identified database table columns are related to time values, where a begin timestamp value is less than a corresponding end timestamp value in the predicate of the query, and adding a constraint in the predicate of the query for the begin timestamp column, and wherein the constraint is based on a relationship between data values of the begin timestamp column and the end timestamp column; and perform the modified query to obtain results for the query.

8. The system of claim 7, wherein the one or more processors are further configured to:

determine associations between database table columns in the predicate of the query and columns of one or more indexes on a database table of the query.

9. The system of claim 8, wherein the associations include a confidence score, and the one or more processors, to determine the associations, are configured to:

determine the confidence score based on counts of values in the database table columns of the predicate of the query and the columns of the one or more indexes.

10. The system of claim 8, wherein the one or more processors, to determine the associations, are configured to:

determine the associations between the database table columns in the predicate of the query and the columns of one or more indexes based on differences between data values and column descriptions.

11. The system of claim 7, wherein the one or more processors, to identify database table columns in a predicate of the query, are configured to:

generate a set of queries including the identified database table columns; and verify the identified database table columns are associated by comparing results obtained from the set of queries.

12. A non-transitory computer-readable medium storing a set of instructions for wireless communication, the set of instructions comprising:

one or more instructions that, when executed by one or more processors of a device, cause the device to:

identify database table columns in a predicate of a query with a greatest association;

modify the query by modifying the predicate of the query based on an association between the identified database table columns, wherein the association is determined by dividing each of the identified database table columns according to value ranges and calculating a respective similarity value for each value range, wherein the one or more instructions, to cause the device to modify the predicate of the query, cause the device to analyze the predicate of the query to determine that a begin timestamp column and an end timestamp column of the identified database table columns are related to time values, where a begin timestamp value is less than a corresponding end timestamp value in the predicate of the query, and adding a constraint in the predicate of the query for the begin timestamp column, and wherein the constraint is based on a relationship between data values of the begin timestamp column and the end timestamp column; and perform the modified query to obtain results for the query.

13. The non-transitory computer-readable medium of claim 12, wherein the one or more instructions cause the device to:

determine associations between database table columns in the predicate of the query and columns of one or more indexes on a database table of the query.

14. The non-transitory computer-readable medium of claim 13, wherein the associations include a confidence score, and wherein the one or more instructions, to cause the device to determine associations, cause the device to:

determine the confidence score based on counts of values in the database table columns in the predicate of the query and the columns of the one or more indexes.

15. The non-transitory computer-readable medium of claim 13, wherein the one or more instructions, to cause the device to determine associations, cause the device to:

determine the associations between the database table columns in the predicate of the query and the columns of one or more indexes based on differences between data values and column descriptions.

16. The non-transitory computer-readable medium of claim 12, wherein the one or more instructions, to cause the device to identify database table columns in a predicate of the query, cause the device to:

generate a set of queries including the identified database table columns; and verify the identified database table columns are associated by comparing results obtained from the set of queries.

17. The non-transitory computer-readable medium of claim 12, wherein the one or more instructions further cause the device to:

validate the modified query by comparing results obtained from the query and the modified query.

18. The method of claim 2, wherein the associations include a confidence score and determining associations comprises:

determining the confidence score based on a cluster ratio determined based on a ratio of values in a database table column in a key sequence and a number of values in the database column.

19. The system of claim 8, wherein the associations include a confidence score, and the one or more processors, to determine the associations, are configured to:

determine the confidence score based on a cluster ratio determined based on a ratio of values in a database table column in a key sequence and a number of values in the database column.

20. The non-transitory computer-readable medium of claim 13, wherein the associations include a confidence score, and wherein the one or more instructions, to cause the device to determine associations, cause the device to:

determine the confidence score based on a cluster ratio determined based on a ratio of values in a database table column in a key sequence and a number of values in the database column.

* * * * *